(12) United States Patent
Yong et al.

(10) Patent No.: US 11,820,587 B2
(45) Date of Patent: Nov. 21, 2023

(54) HOPPER FOR RAW MATERIAL POWDER AND METHOD FOR TRANSFERRING RAW MATERIAL POWDER BY USING SAME

(71) Applicants: HYUNDAI MOTOR COMPANY, Seoul (KR); KIA CORPORATION, Seoul (KR)

(72) Inventors: Wang Hyun Yong, Hwaseong-si (KR); Ji Min Yu, Seoul (KR); Hyung Jin Jeon, Asan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 50 days.

(21) Appl. No.: 17/532,854

(22) Filed: Nov. 22, 2021

(65) Prior Publication Data

US 2022/0363469 A1 Nov. 17, 2022

(30) Foreign Application Priority Data

May 13, 2021 (KR) .................. 10-2021-0062015

(51) Int. Cl.
*B65D 88/26* (2006.01)
*B65B 1/06* (2006.01)
(Continued)

(52) U.S. Cl.
CPC .............. *B65D 88/26* (2013.01); *B65B 57/10* (2013.01); *B65D 65/40* (2013.01); *B65D 90/48* (2013.01);
(Continued)

(58) Field of Classification Search
CPC ........ B65D 88/26; B65D 90/48; B65D 90/64; B65G 65/30; B65G 2201/042;
(Continued)

(56) References Cited

U.S. PATENT DOCUMENTS

| 1,538,239 A | * | 5/1925 | Claudepierre | .......... A47L 13/52 |
| | | | | 312/211 |
| 2,194,633 A | * | 3/1940 | Bemis | ..................... B65B 37/00 |
| | | | | 141/105 |

(Continued)

FOREIGN PATENT DOCUMENTS

| JP | H0517807 A | 1/1993 |
| JP | H07146080 A | 6/1995 |

(Continued)

*Primary Examiner* — Frederick C Nicolas
(74) *Attorney, Agent, or Firm* — LEMPIA SUMMERFIELD KATZ LLC

(57) ABSTRACT

A hopper and method for transferring raw material, which can prevent segregation due to the impact caused by falling of the raw material powder when different types of raw material powders are transferred. The hopper for a raw material powder according to one embodiment of the present disclosure includes: a hopper body having an inner space in which the raw material powder is stored and including an outlet which is formed through the lower end thereof and through which the raw material powder is discharged; a transfer pipe to which the raw material powder discharged through the outlet is transferred and which has a region, through which the raw material powder is transferred, divided into a plurality of regions; and a slide gate unit disposed between the outlet and the transfer pipe to open or close the transfer pipe while adjusting a degree of opening of the transfer pipe.

12 Claims, 6 Drawing Sheets

(51) Int. Cl.
   *B65G 65/30* (2006.01)
   *B65B 57/10* (2006.01)
   *B65D 90/48* (2006.01)
   *B65D 65/40* (2006.01)
   *B65D 90/64* (2006.01)
   *B22F 3/00* (2021.01)
   *B22F 1/12* (2022.01)
   *B22F 1/05* (2022.01)
   *C22C 33/02* (2006.01)

(52) U.S. Cl.
   CPC ............ *B65D 90/64* (2013.01); *B65G 65/30* (2013.01); *B22F 1/05* (2022.01); *B22F 1/12* (2022.01); *B22F 3/004* (2013.01); *B65B 1/06* (2013.01); *B65G 2201/042* (2013.01); *C22C 33/0207* (2013.01)

(58) Field of Classification Search
   CPC .......... B65G 65/40; B65B 1/06; B65B 57/10; B22F 1/05; B22F 1/12; B22F 3/004; C22C 33/0207
   See application file for complete search history.

(56) References Cited

U.S. PATENT DOCUMENTS

| | | | | |
|---|---|---|---|---|
| 2,460,605 A * | 2/1949 | Soissa | ............ | D21H 27/02 366/186 |
| 4,031,032 A * | 6/1977 | Jablecki | ............ | B01D 17/0214 210/474 |
| 4,176,767 A * | 12/1979 | Franche, IV | ............ | B65D 90/60 222/561 |
| 4,178,151 A * | 12/1979 | Huestis | ............ | F27D 21/04 432/95 |
| 4,201,315 A * | 5/1980 | Chuss | ............ | C10B 31/04 340/617 |
| 4,619,379 A * | 10/1986 | Biehl | ............ | A47F 1/035 222/243 |
| 4,856,681 A * | 8/1989 | Murray | ............ | A47F 1/035 222/243 |
| 4,940,850 A * | 7/1990 | Satake | ............ | B07C 5/3425 209/582 |
| 4,949,940 A * | 8/1990 | Weber | ............ | F27B 1/20 266/199 |
| 4,971,135 A * | 11/1990 | Bailey | ............ | B22C 5/10 164/192 |
| 5,271,609 A | 12/1993 | Kepplinger et al. | | |
| 5,850,942 A * | 12/1998 | DeSimone | ............ | B67D 3/0022 222/461 |
| 5,901,886 A * | 5/1999 | Grindstaff | ............ | A01K 5/0275 222/548 |
| 6,189,802 B1 * | 2/2001 | Holton | ............ | A01C 15/02 239/687 |
| 6,367,661 B1 * | 4/2002 | Valente | ............ | B67C 11/04 222/181.2 |
| 6,884,956 B2 * | 4/2005 | Murata | ............ | B07C 5/3425 209/582 |
| 7,328,808 B2 * | 2/2008 | Kokko | ............ | B07B 11/06 209/644 |
| 8,028,865 B2 * | 10/2011 | DeJonge | ............ | G01F 11/261 222/472 |
| 8,448,602 B2 * | 5/2013 | Lytle | ............ | A01K 5/0233 119/55 |
| 9,522,778 B2 * | 12/2016 | Southwell | ............ | B65D 90/587 |
| 9,873,532 B2 * | 1/2018 | Canestri | ............ | B65B 1/32 |
| 2007/0028466 A1 * | 2/2007 | Slye | ............ | G01B 21/02 33/1 PT |
| 2008/0029546 A1 * | 2/2008 | Schuld | ............ | B65D 88/26 222/488 |
| 2008/0277423 A1 * | 11/2008 | Garton | ............ | B29C 41/06 222/561 |
| 2016/0024308 A1 * | 1/2016 | Hamby | ............ | C09C 1/48 264/405 |

FOREIGN PATENT DOCUMENTS

| | | |
|---|---|---|
| JP | 2000225329 A | 8/2000 |
| JP | 2009029431 A | 2/2009 |
| JP | 5082487 B2 | 11/2012 |
| JP | 6747232 B2 | 8/2020 |

* cited by examiner

HOPPER FOR RAW MATERIAL POWDER AND METHOD FOR TRANSFERRING RAW MATERIAL POWDER BY USING SAME

CROSS REFERENCE TO RELATED APPLICATION

The present application claims priority to Korean Patent Application No. 10-2021-0062015 filed on May 13, 2021, the entire contents of which are incorporated herein for all purposes by this reference.

BACKGROUND

1. Field

The present disclosure relates to a hopper for a raw material powder and a method for transferring a raw material powder by using the same. More specifically, the present disclosure relates to a hopper for a raw material powder and a method for transferring a raw material powder by using the same, wherein when different types of raw material powder are transferred, segregation caused by an impact due to falling of the raw material powder can be prevented.

2. Description of the Prior Art

When an iron-based structure component is manufactured through powder metallurgy, at least one alloy element (for example, copper or nickel) is added thereto and used together to improve mechanical characteristics of the iron powder.

Schemes for adding alloy elements to iron powder are classified into mixing types, by which alloy element powder is added to iron-based powder and then used, and alloying types, by which iron powder and alloy elements are alloyed and then used.

According to the mixing type, iron powder is physically mixed with desired kinds and proportions of alloy element powder. According to the alloying type, a molten metal alloyed to have desired proportions is sprayed and turned into powder.

Therefore, the alloying type has no concern of powder segregation because all powder particles have the same composition. However, this has a problem in that the solid solution strengthening effect of alloy elements included in the powder degrades compressibility. Further, powder manufacturing has high costs.

In contrast, according to the mixing type, major raw materials having different particle sizes, shapes, densities, and specific gravities are introduced into a hopper and physically mixed. Therefore, the mixing type has low manufacturing costs and has good compressibility, but is not free from the problem of powder segregation occurring in the handling process.

Particularly, in the case of the mixing type, various kinds of auxiliary raw materials may be added in large quantities. The problem of segregation may occur due to a difference in specific gravity in the processes of mixing the main and auxiliary raw materials and transferring the mixed powder.

This causes problems such as local deviations in physical characteristics (for example, strength and hardness) of the manufactured mechanical component, and degraded assembly convenience due to dimension irregularities, thereby failing to achieve the required product characteristics.

In addition, auxiliary raw materials (for example, carbon and lubricant) necessarily added to major raw materials become main factors that cause segregation due to low specific gravities. Therefore, there has been continuous research regarding uniform mixing of such auxiliary raw materials and prevention of segregation in the processes of classification, transfer, and packaging after mixing.

Furthermore, during the processes of classification, transfer, and packaging after mixing, raw material powder is transferred using free falls caused by the gravity through a transfer pipe. However, the impact due to the height of falling raw material powder scatters auxiliary raw materials having low specific gravities, thereby causing segregation, which is a problem.

The above description regarding background technologies has been made only to enhance understanding of the background of the present disclosure. The above description is not to be deemed by those having ordinary skill in the art to correspond to already-known prior art.

SUMMARY

The present disclosure provides a hopper for a raw material powder and a method for transferring a raw material powder by using the same, wherein when raw material powder obtained by mixing powders having different specific gravities is transferred, segregation caused by an impact due to falling of the raw material powder can be prevented.

A hopper for a raw material powder according to an embodiment of the present disclosure includes: a hopper body having an inner space in which a raw material powder is stored and including an outlet which is formed through a lower end thereof and through which the raw material powder is discharged; a transfer pipe to which the raw material powder discharged through the outlet is transferred and which has a region, through which the raw material powder is transferred, divided into a plurality of regions; and a slide gate unit disposed between the outlet and the transfer pipe to open or close the transfer pipe while adjusting a degree of opening of the transfer pipe.

The transfer pipe is provided with at least one division plate which is provided therein and provides a plurality of transfer paths by dividing a region through which the raw material powder is transferred. The slide gate unit includes a plurality of gates configured to open or close the divided transfer paths of the transfer pipe, respectively, and a plurality of moving shafts configured to operate the gates, respectively.

The transfer pipe has a cross-sectional area of the region through which the raw material powder is transferred, equally divided by the division plate.

The hopper for a raw material powder further includes a control unit configured to control an operation of the slide gate unit according to a storage amount and particle size of the raw material powder stored in the hopper body, to adjust a degree of opening of the transfer pipe.

The control unit individually controls operations of the plurality of moving shafts to adjust a degree of opening of the transfer pipe.

The control unit lowers the degree of opening of the transfer pipe as a particle size of the raw material powder stored in the hopper body decreases.

The hopper body is provided with at least one level sensor configured to sense the raw material powder to be stored therein. The control unit detects a storage amount of the raw material powder stored in the hopper body according to a signal sensed by the level sensor.

A method for transferring a raw material powder according to another embodiment of the present disclosure includes: a classifying operation of classifying the raw material powder by particle size; a storing operation of storing the classified raw material powder in a hopper body; and a transferring operation of discharging and transferring the raw material powder stored in the hopper body through a transfer pipe having a region, through which the raw material powder freely falls to be transferred, divided into a plurality of regions while adjusting a degree of opening of the transfer pipe to discharge the raw material powder.

The degree of opening of the transfer pipe is adjusted in the transferring operation according to a particle size of the raw material powder classified in the classifying operation.

The degree of opening of the transfer pipe in the transferring operation is lowered as a particle size of the raw material powder classified in the classifying operation decreases.

In the transferring operation, the degree of opening of the transfer pipe is controlled by adjusting opening and closing of a region selected from among the plurality of divided regions.

In the classifying operation, when the raw material powder to be classified has a particle size allowing passage through a classifying screen of 10 mesh to 25 mesh, the degree of opening of the transfer pipe is adjusted to 100%. When the raw material powder to be classified has a particle size allowing passage through a classifying screen of greater than 25 mesh and equal to or less than 40 mesh, the degree of opening of the transfer pipe is adjusted to 75%. When the raw material powder to be classified has a particle size allowing passage through a classifying screen of 40 mesh to 55 mesh, the degree of opening of the transfer pipe is adjusted to 50%. When the raw material powder to be classified has a particle size allowing passage through a classifying screen of greater than 55 mesh, the degree of opening of the transfer pipe is adjusted to 25%.

In the storing operation, a storage amount of the raw material powder to be stored in the hopper body is measured in real time. The degree of opening of the transfer pipe is adjusted to 0% in the transferring operation when a storage rate of the raw material powder stored in the hopper body is 5% or less. The degree of opening of the transfer pipe is adjusted to 100% in the transferring operation when a storage rate of raw material powder stored in the hopper body is 95% or greater.

Embodiments of the present disclosure are advantageous as follows.

Firstly, the degree of opening of the transfer pipe through which raw material powder is transferred may be adjusted differently according to the particle size of the raw material powder, thereby preventing segregation caused by an impact due to falling of the raw material powder during transfer thereof, and accordingly preventing segregation from occurring in the raw material powder.

Secondly, raw material powder including a mixture of powders having different specific gravities may be transferred while remaining mixed uniformly such that a sintered component using the raw material powder may have excellent mechanical characteristics and minimized dimension deviations, thereby making it possible to manufacture a high-strength precision component.

Thirdly, the condition (e.g., manner, amount) to transfer raw material powder may be selected with an increased degree of freedom according to the condition of the classifying process after the raw material powder mixing process, thereby improving the productivity.

BRIEF DESCRIPTION OF THE DRAWINGS

The above and other aspects, features and advantages of the present disclosure should be more apparent from the following detailed description taken in conjunction with the accompanying drawings, in which.

DETAILED DESCRIPTION OF THE EMBODIMENTS

Figure 1:
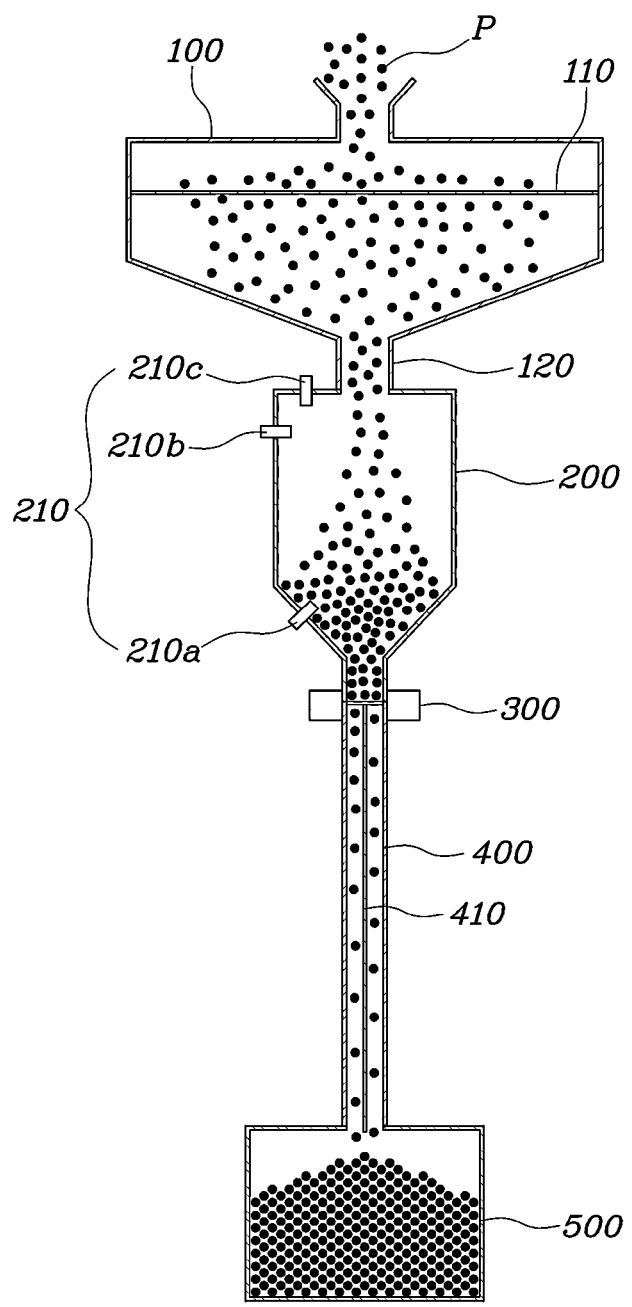
FIG. 1 illustrates a raw material processing system including a hopper for a raw material powder according to one embodiment of the present disclosure.

Hereinafter, embodiments of the present disclosure are described in more detail with reference to the accompanying drawings. However, the present disclosure is not limited to the embodiments disclosed below but can be implemented in a variety of different forms. The embodiments disclosed below are only provided to allow the present disclosure to be complete and to fully inform those of ordinary skill in the art of the present disclosure. In the drawings, like reference numerals refer to like elements. When a component, device, element, or the like of the present disclosure is described as having a purpose or performing an operation, function, or the like, the component, device, or element should be considered herein as being "configured to" meet that purpose or to perform that operation or function.

FIG. 1 illustrates a raw material processing system including a hopper for a raw material powder according to one embodiment of the present disclosure.

As shown in FIG. 1, the raw material processing system including a hopper for a raw material powder according to one embodiment of the present disclosure includes: a classifier 100 for classifying a raw material powder (P) by particle size; a hopper 200, 300, and 400 for temporarily storing the raw material powder (P) classified and ejected by the classifier 100 and then discharging the same (raw material powder (P)) while controlling the discharge amount thereof; and a packaging machine 500 to which the raw material powder (P) discharged from the hopper 200, 300, and 400 freely falls to be packed thereby in a loaded state.

As used herein, the raw material powder (P) refers to a mixture of various types of powder having different specific gravities, which is hereinafter collectively referred to as a "raw material powder".

The classifier 100 is a means for classifying the raw material powder (P) by particle size by using a classifying screen 110 provided therein. In the present embodiment, the classifier 100 is not limited to a specific shape and form and may be implemented as a classifier having various shapes and forms. However, the classifier 100 may be configured such that various types of classifying screens 110 having different mesh sizes can be used according to the user's selection. For example, the classifier 100 according to the present embodiment is a classifier which is applied to an iron-based powder used in the case of producing iron-based structural components by powder metallurgy and may employ the classifying screen 110 having a mesh size of 10 to 70 mesh.

A discharge pipe 120, through which the raw material powder (P) having passed through the classifying screen 110 to be classified by particle size is discharged, is provided at the lower portion of the classifier 100.

The hopper 200, 300, and 400, which is a means for transferring the raw material powder (P) classified and discharged from the classifier 100 to the packaging machine 500 while suppressing the occurrence of segregation, has divided paths through which the raw material powder (P) is transferred. The hopper 200, 300, and 400 controls a transfer amount of the raw material powder (P) transferred through the divided paths, to prevent the segregation which may occur during the transfer of the raw material powder (P). The specific configuration and operating relationship of the hopper 200, 300, and 400 are described in detail below.

The packaging machine 500 is a means for packing the raw material powder (P) which is transferred through the hopper 200, 300, and 400 and loaded in a state in which the occurrence of segregation is suppressed. The packaging machine 500 in the present embodiment is not limited to a specific shape and form and may be implemented as a packaging machine having various shapes and forms as in the classifier 100. For example, the packaging machine 500 according to the present embodiment is a packaging machine which is applied to an iron-based powder used in the case of producing iron-based structural components by powder metallurgy and may pack the raw material powder (P) transferred through hopper 200, 300, and 400 in a packaging container having a specific volume while allowing the same to be loaded therein.

Next, the hopper, which is a major component of the present disclosure, is described in detail with reference to the drawings.

Figure 2:
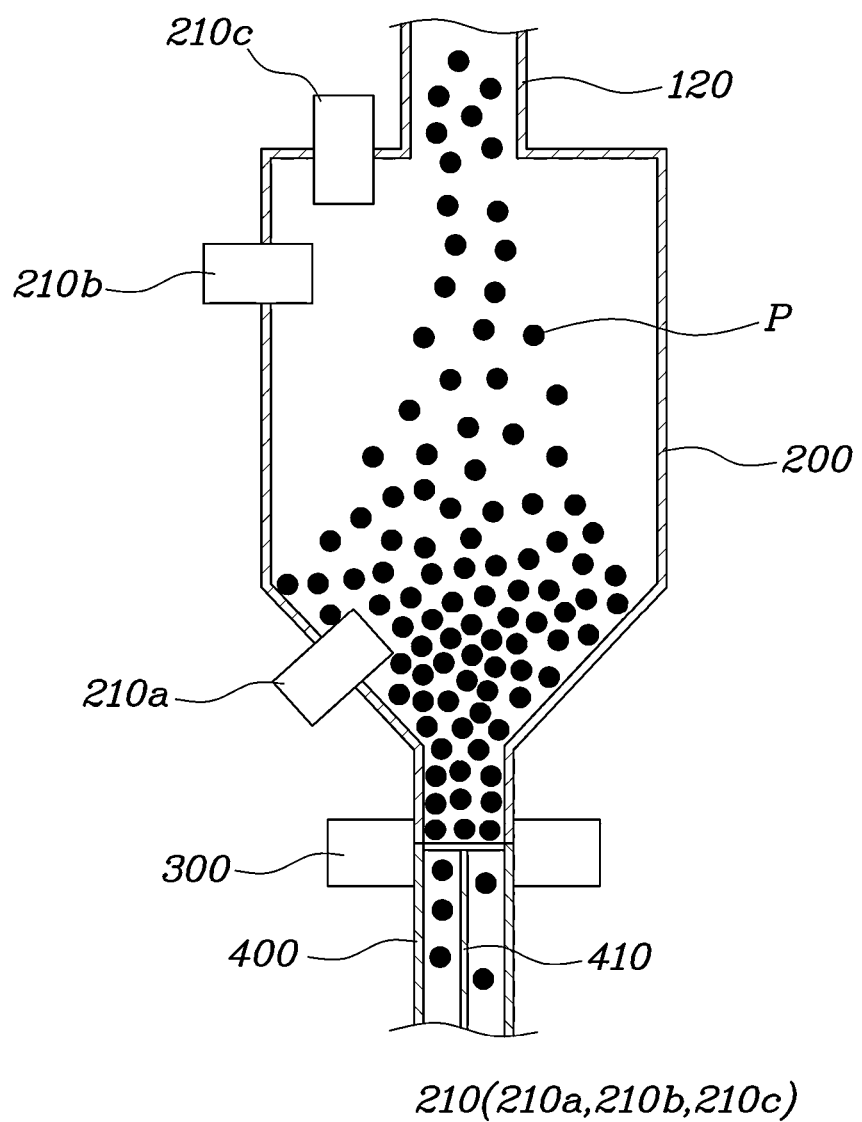
FIG. 2 illustrates a hopper for a raw material powder according to one embodiment of the present disclosure.
Figure 3:
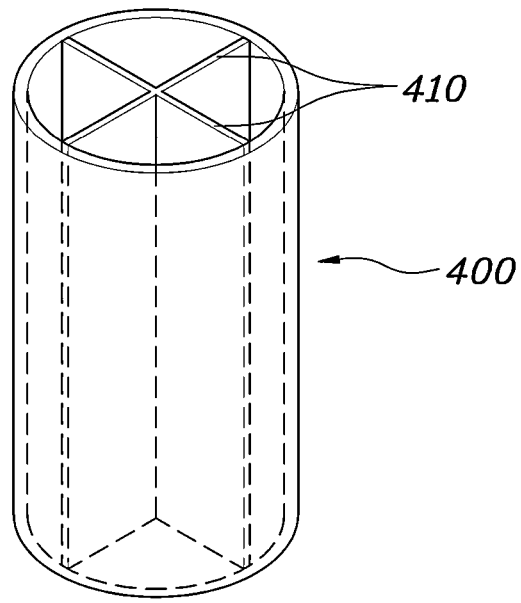
FIG. 3 illustrates a transfer pipe of a hopper for a raw material powder according to one embodiment of the present disclosure.
Figure 4:
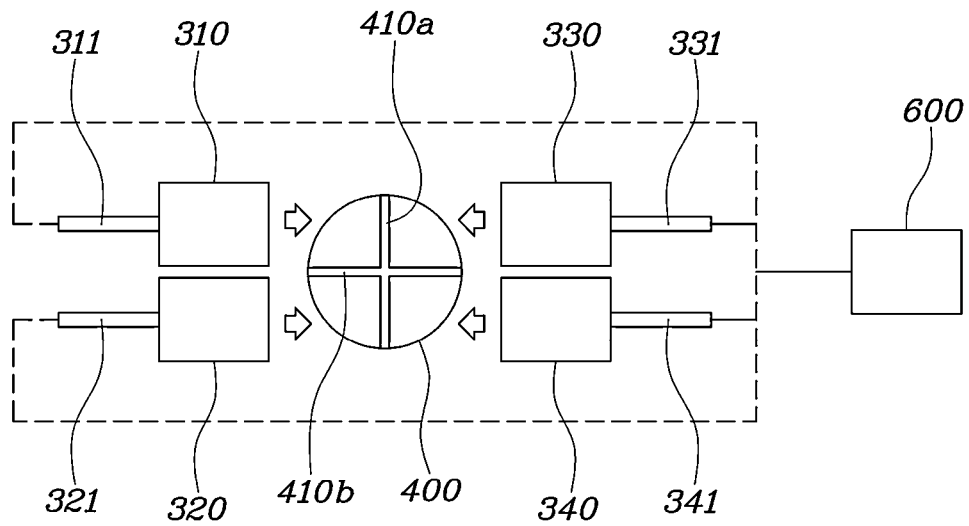
FIG. 4 illustrates a slide gate unit of a hopper for a raw material powder according to one embodiment of the present disclosure.
Figure 5:
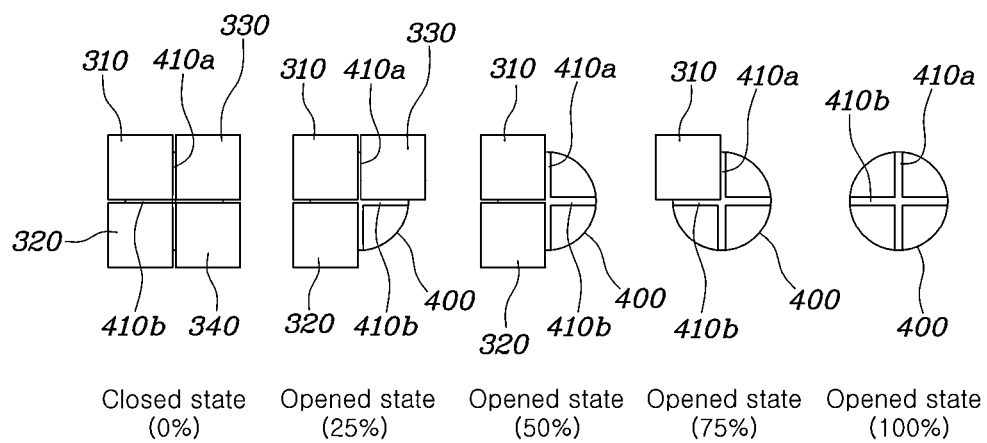
FIG. 5 illustrates an example in which a degree of opening of a transfer pipe is adjusted using a hopper for a raw material powder according to one embodiment of the present disclosure.

FIG. 2 illustrates a hopper for a raw material powder according to one embodiment of the present disclosure. FIG. 3 illustrates a transfer pipe of a hopper for a raw material powder according to one embodiment of a present disclosure. FIG. 4 illustrates a slide gate unit of a hopper for a raw material powder according to one embodiment of the present disclosure. FIG. 5 illustrates an example in which a degree of opening of a transfer pipe is adjusted using a hopper for a raw material powder according to one embodiment of the present disclosure.

As shown in FIGS. 2-5, the hopper for the raw material powder according to one embodiment of the present disclosure includes: a hopper body 200 having an inner space in which a raw material powder (P) is stored and including an outlet which is formed through the lower end thereof and through which the raw material powder (P) is discharged; a transfer pipe 400 to which the raw material powder (P) discharged through the outlet is transferred and which has a region, through which the raw material powder (P) is transferred, divided into a plurality of regions; and a slide gate unit 300 disposed between the outlet and the transfer pipe 400 to open or close the transfer pipe 400 while adjusting a degree of opening of the transfer pipe 400.

The hopper body 200, which is a means for providing a space in which the raw material powder (P) discharged from the classifier 100 is filled to be temporarily stored, includes a filling hole which is formed through the upper end thereof and communicates with the discharge pipe 120 of the classifier 100. The hopper body 200 includes an outlet which is formed through the lower end thereof and through which the raw material powder (P) is discharged.

The hopper body 200 may be provided with at least one level sensor 210 for sensing the raw material powder (P) to be stored therein, to detect a storage amount thereof.

The level sensor 210 may be arranged in each of a lower region, a middle region, and an upper region with reference to the height of the hopper body 200 to detect the amount of the raw material powder (P) stored in the hopper body 200 in real time. For example, a first level sensor 210a, a second level sensor 210b, and a third level sensor 210c are arranged in the lower region, the middle region, and the upper region of the hopper body 200, respectively, so that the storage amount of the raw material powder (P) stored in the hopper body 200 can be detected according to a signal value of raw material powder detected by the first level sensor 210a, the second level sensor 210b, and the third level sensor 210c.

The transfer pipe 400 is a means for transferring the raw material powder (P) discharged through the outlet of the hopper body 200 to the packaging machine 500. The transfer pipe 400 induces the raw material powder (P) to freely fall so that the raw material powder (P) can be transferred without a separate power source. For example, the transfer pipe 400 may be formed of a pipe-shaped piping line extending directly downward from the outlet of the hopper body 200 so as to be connected in the vertical direction.

However, in the present embodiment, the region through which the raw material powder (P) is transferred may be divided into a plurality of regions in order to minimize the scattering of the raw material powder (P) transferred through the transfer pipe 400 while freely falling along the transfer pipe 400.

As shown in FIGS. 3 and 4, the transfer pipe 400 may include at least one division plate 410 which is provided therein and provides a plurality of transfer paths by dividing the cross-sectional area of the region through which the raw material powder (P) is transferred.

For example, in order to divide a transfer path of the transfer pipe 400 having a circular cross-sectional area, a first division plate 410a may be arranged in the longitudinal direction and a second division plate 410b may be arranged in the horizontal direction, thereby dividing the cross section of the transfer pipe 400 in a "+" shape, as shown in FIGS. 3 and 4. In this case, the transfer pipe 400 may be divided by the division plate 410 to have equally divided spaces so as to easily adjust the degree of opening thereof.

The slide gate unit 300, which is a means for adjusting the degree of opening of the transfer pipe 400 by opening or closing the divided transfer paths of the transfer pipe 400, includes: a plurality of gates 310, 320, 330, and 340 having a shape and number corresponding to the divided transfer paths of the transfer pipe 400; and a plurality of moving shafts 311, 321, 331, and 341 for individually operating the gates 310, 320, 330, and 340.

The gates 310, 320, 330, and 340 are a means for opening or closing the open uppermost end of the transfer pipe 400 and are formed in a shape capable of opening and closing the open regions of the transfer pipe 400 divided by the division plate 410 as described above. For example, in the present embodiment, as shown in FIG. 4, each of the gates 310, 320, 330, and 340 may be provided in the form of a rectangular flat plate to be operated in the horizontal direction so as to open or close the open regions of the transfer pipe 400.

In this case, the gates 310, 320, 330, and 340 are connected to the moving shafts 311, 321, 331, and 341, respectively, and are individually operated by operations of the respective moving shafts 311, 321, 331, and 341. In this example, a cylinder rod operated by pneumatic or hydraulic pressure may be applied to the moving shafts 311, 321, 331, and 341, or the moving shafts 311, 321, 331, and 341 may be connected to the cylinder rod to be operated in association therewith.

In the present embodiment, as shown in FIG. 4, four gates 310, 320, 330, 340 and four moving shafts 311, 321, 331, 341 are provided since the transfer path of the transfer pipe 400 is divided into quarters by using the first division plate 410a and the second split dividing 410b. Thus, the first gate 310, the second gate 320, the third gate 330, and the fourth gate 340 are respectively disposed on the four quartered transfer paths of the transfer pipe 400. The first gate 310, the second gate 320, the third gate 330, and the fourth gate 340 are connected to the first moving shaft 311, the second moving shaft 321, the third moving shaft 331, and the fourth moving shaft 341, respectively, to be operated individually.

The present embodiment may further include a control unit 600 for controlling the operation of the slide gate unit 300 according to the storage amount and particle size of the raw material powder (P) stored in the hopper body 200, thereby adjusting the degree of opening of the transfer pipe 400.

Thus, as shown in FIG. 5, the control unit 600 may individually control the operations of the first moving shaft 311, the second moving shaft 321, the third moving shaft 331, and the fourth moving shaft 341 so as to individually control opening and closing of the divided regions of the transfer pipe 400 by the first gate 310, the second gate 320, the third gate 330, and the fourth gate 340. Accordingly, the control unit 600 may adjust the degree of opening of the transfer pipe 400 to 0%, 25%, 50%, 75%, and 100%.

Particularly, the controller 600 may lower the degree of opening of the transfer pipe 400 as the particle size of the raw material powder (P) stored in the hopper body 200 decreases.

Therefore, the cross-sectional area of the transfer pipe (400) through which the raw material powder (P) is transferred is reduced as the particle size of the raw material powder (P) decreases, thereby reducing a space in which the raw material powder (P) may be scattered while being transferred. Accordingly, the raw material powder (P) can be prevented from scattering and can be loaded in the packaging machine 500 while being maintained in a uniformly mixed state.

In addition, the control unit 600 may detect the storage amount of the raw material powder (P) stored in the hopper body 200 according to a signal sensed by the level sensor 210 provided in the hopper body 200 and control the operation of the slide gate unit 300 according to the storage amount of the raw material powder (P) to adjust the degree of opening of the transfer pipe 400.

For example, when a storage rate of the raw material powder (P) stored in the hopper body 200 is 5% or less, the degree of opening of the transfer pipe 400 may be adjusted to 0% to allow an appropriate level of the raw material powder (P) to be stored in the hopper body 200.

When a storage rate of the raw material powder (P) stored in the hopper body 200 is 95% or more, the degree of opening of the transfer pipe 400 may be adjusted to 100% in order to prevent the raw material powder (P) from being filled in excess of the capacity of the hopper body 200. Thus, the raw material powder (P) may be discharged from the hopper body 200.

A method for transferring and packaging a raw material powder by using a raw material powder processing system including a hopper for a raw material powder, configured as described above, is described below.

The method for transferring a raw material powder according to one embodiment of the present disclosure includes: a classifying operation of classifying a raw material powder (P) by particle size; a storing operation of storing the classified raw material powder (P) in the hopper body 200; and a transferring operation of discharging and transferring the raw material powder (P) stored in the hopper body 200 through the transfer pipe 400 having a region, through which the raw material powder (P) freely falls to be transferred, divided into a plurality of regions, while adjusting the degree of opening of the transfer pipe 400 to discharge the same.

In addition, the method may further include a packing operation of packing the raw material powder (P) transferred through the transferring operation in a specific volume by the packaging machine 500.

The classifying operation, which is an operation for sorting and classifying the raw material powder (P) filled into the classifier 100 by particle size, allows the raw material powder (P) to pass through the classifier 100 in which the classifying screen 110 with a size desired by a user is installed, whereby the raw material powder (P) having a desired particle size is filled into the hopper body 200.

The storing operation is an operation for temporarily storing the raw material powder (P) discharged from the classifier 100 in the hopper body 200. In the storing operation, the raw material powder (P) to be stored in the hopper body 200 is stored while a storage amount thereof is detected in real time.

The transferring operation is an operation for transferring the raw material powder (P) stored in the hopper body 200 to the packaging machine 500 in a desired amount through the transfer pipe 400. In the transferring operation, the raw material powder (P) is transferred while the degree of opening of the transfer pipe 400 is adjusted according to the particle size of the raw material powder (P) classified through the classifying operation. Thus, the raw material powder (P) can be prevented from scattering due to the impact generated when the raw material powder (P) is transferred and freely falls to the packaging machine 500. In this way, segregation occurring while the raw material powder (P) is loaded in the packaging machine 500 is suppressed.

Particularly, the degree of opening of the transfer pipe 400 during the transferring is adjusted to be lowered as the particle size of the raw material powder (P) classified through the classifying operation decreases. The lowering of the degree of opening of the transfer pipe 400 is achieved by individually opening or closing the divided spaces of the transfer pipe 400.

For example, the lowering of the degree of opening of the transfer pipe 400 can be achieved by adjusting the opening and closing of a region selected from among the plurality of quartered regions of the transfer pipe 400 to gradually decrease the number of spaces to be opened among the divided spaces.

Thus, the raw material powder (P) is prevented from scattering during the transfer of the raw material powder (P) by decreasing the cross-sectional area of the transfer pipe 400, through which the raw material powder (P) is transferred, as the particle size of the raw material powder (P) decreases.

For example, in the classifying operation, when the raw material powder (P) to be classified has a particle size allowing passage through a classifying screen 100 of 10 mesh-25 mesh, the degree of opening of the transfer pipe 400 may be adjusted to 100%.

In addition, when the raw material powder (P) to be classified has a particle size allowing passage through a classifying screen 100 of greater than 25 mesh and equal to or smaller than 40 mesh, the degree of opening of the transfer pipe 400 may be adjusted to 75%.

Furthermore, when the raw material powder (P) to be classified has a particle size allowing passage through a classifying screen 100 of 40 mesh-55 mesh, the degree of opening of the transfer pipe 400 may be adjusted to 50%. When the raw material powder (P) to be classified has a particle size allowing passage through a classifying screen 100 of greater than 55 mesh, the degree of opening of the transfer pipe 400 may be adjusted to 25%.

In the storing operation, by measuring a storage amount of the raw material powder (P) to be stored in the hopper body 200 in real time, the degree of opening of the transfer pipe 400 may be adjusted to 0% in the transferring operation when a storage rate of the raw material powder (P) stored in the hopper body 200 is 5% or less. The degree of opening of the transfer pipe 400 may be adjusted to 100% in the transferring operation when the storage rate of the raw material powder (P) stored in the hopper body 200 is 95% or greater.

Next, the present disclosure is described through a comparative example and other examples.

Experiment 1

An experiment was conducted to find out the degree of segregation of carbon (C) which is mixed as an auxiliary material, given that a binder mixture powder is used as a raw material powder.

The binder mixture powder used as the raw material powder is a powder having the components and contents as shown in Table 1 below in a binder-dedicated mixer with a capacity of 2 tons.

TABLE 1

| Component | Content (wt %) |
|---|---|
| Tin | 5 |
| Phosphorus | 0.25 |
| Graphite powder | 2.1 |
| Manganese sulfide | 0.5 |
| Lubricant | 0.8 |
| Pure iron | The balance |

The raw material powder mixed with the components and contents as shown in Table 1 is mixed under the conditions as shown in Table 2 below. The raw material powder is attached using an organic binder while being heated to a certain temperature, and the uniformly bound and mixed raw material powder is cooled to room temperature.

TABLE 2

| Mixing by heating | | | Mixing by cooling | | |
|---|---|---|---|---|---|
| Heating temperature | Mixing rate | Mixing time | Cooling temperature | Mixing rate | Mixing time |
| 140° C. | 40 Hz | 15 min. | 40° C. | 25 Hz | 15 min. |

The raw material powder having passed through a classifier equipped with a classifying screen having a mesh size of 60 is stored in a hopper body, and degree of opening of a transfer pipe are adjusted to 25%, 50%, 75%, and 100%, respectively, when the same is discharged.

The raw material powder is transferred according to the degree of opening to be loaded in a packaging machine and is packaged in 1 ton units.

Figure 6:
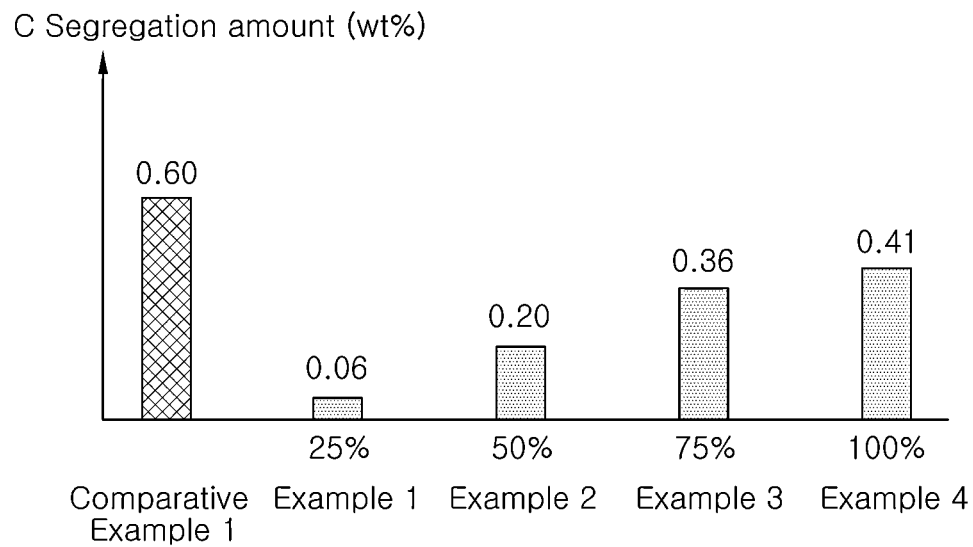
FIGS. 6-9 are graphs showing results of experiments carried out to find out a segregation prevention effect according to a comparative example and other examples.

In order to check the component deviation in a 1 ton bag, the content and the segregation amount of the carbon (C) with respect to the raw material powder (comparative example 1) to which a hopper according to the present disclosure is not applied and the raw material powders (examples 1-4) obtained by adjusting the degree of opening of a transfer pipe by applying a hopper according to the present disclosure thereto were tested while the raw material powder contained in a 1 ton bag is discharged in 100 kg units. the results are shown in Table 3 and FIG. 6.

TABLE 3

| Division | Comparative Example 1 (Unapplied) | Example 1 (Degree of opening 25%) | Example 2 (Degree of opening 50%) | Example 3 (Degree of opening 75%) | Example 4 (Degree of opening 100%) |
|---|---|---|---|---|---|
| 100 Kg | 1.84 | 1.96 | 1.92 | 1.88 | 2.02 |
| 200 Kg | 2.00 | 2.00 | 1.98 | 1.93 | 1.99 |
| 300 Kg | 2.32 | 2.02 | 1.92 | 1.99 | 1.78 |
| 400 Kg | 2.30 | 1.96 | 2.05 | 2.11 | 1.99 |
| 500 Kg | 2.11 | 1.96 | 2.01 | 2.02 | 2.08 |
| 600 Kg | 2.07 | 1.97 | 1.85 | 1.75 | 1.92 |
| 700 Kg | 2.17 | 1.96 | 1.92 | 1.79 | 2.07 |
| 800 Kg | 2.44 | 1.98 | 1.95 | 2.10 | 1.81 |
| 900 Kg | 2.28 | 2.02 | 2.03 | 1.85 | 1.77 |
| C Average | 2.17 | 1.98 | 1.96 | 1.94 | 1.95 |

As can be noted from Table 3 and FIG. 6, comparative example 1 showed that the average value of the carbon component in the 1 ton bag was 2.17% and the component deviation was 0.6%. In the meantime, Examples 1-4 showed that the average values of the carbon component are 1.94% to 1.98% and the component deviations are 0.06 to 0.41%.

Particularly, it was confirmed that the effect of reducing the component deviation is far greater in example 1 in which the degree of opening of the transfer pipe was optimized, compared to comparative example 1.

In the case of the binder mixture, each lot weighs 4 tons, and is quartered to be packaged in a 1 ton bag. In order to check the component deviation between the 1 ton bags for the identical lot, the carbon components for respective 1 ton bags were compared, and the results are shown in Table 4 and FIG. 7.

TABLE 4

| Division | Comparative Example 2 (Unapplied) | Example 5 (Degree of opening 25%) | Example 6 (Degree of opening 50%) | Example 7 (Degree of opening 75%) | Example 8 (Degree of opening 100%) |
|---|---|---|---|---|---|
| 1st bag | 2.15 | 1.94 | 1.95 | 1.98 | 1.90 |
| 2nd bag | 2.11 | 1.95 | 1.95 | 1.93 | 1.96 |
| 3rd bag | 2.25 | 1.96 | 1.96 | 1.97 | 1.91 |
| 4th bag | 2.00 | 1.99 | 2.01 | 1.92 | 2.05 |
| C Average | 2.13 | 1.99 | 1.97 | 1.95 | 1.96 |

Figure 7:
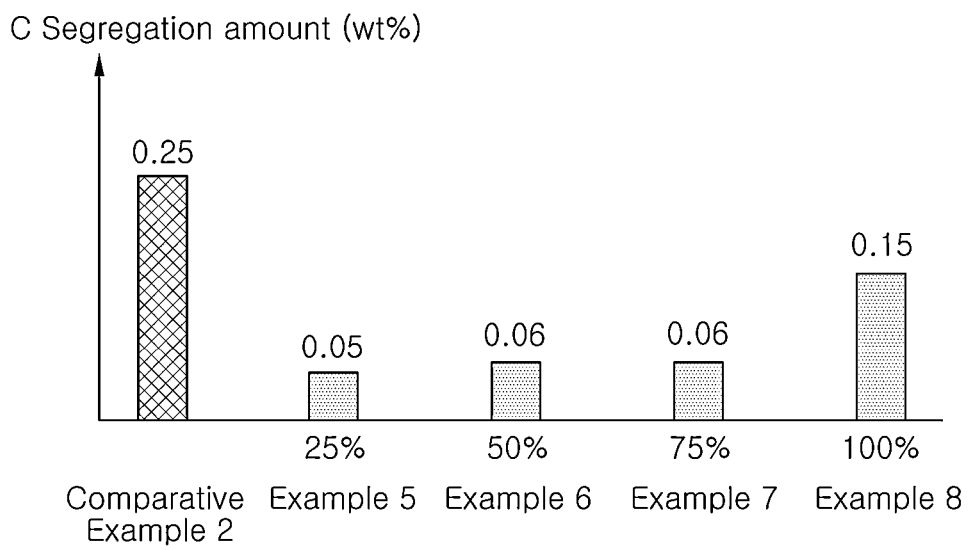

As can be noted from Table 4 and FIG. 7, comparative example 2 showed that the average value of the carbon component in the 1 ton bag is 2.13% and the component deviation is 0.25%. In the meantime, examples 5-8 showed that the average values of the carbon component are 1.95%-1.99% and the component deviations are 0.05-0.15%.

Particularly, it was confirmed that the effect of reducing the component deviation is far greater in example 5 in which the degree of opening of the transfer pipe was optimized, compared to comparative example 2.

Experiment 2

An experiment was conducted to find out the degree of segregation of carbon (C) which is mixed as an auxiliary material, given that a bonding alloy mixture powder is used as a raw material powder.

The binder mixture powder used as a raw material powder is a powder having the components and contents as shown in Table 5 below in a Nauta mixer having a capacity of 5 tons.

TABLE 5

| Component | | Content (wt %) |
|---|---|---|
| Mother powder | Nickel | 4 |
| | Copper | 1.5 |
| | Molybdenum | 0.5 |
| | Pure iron | The balance |
| Graphite powder | | 0.6 |
| Lubricating powder | | 0.6 |

The raw material powder mixed with the components and contents as shown in Table 5 is mixed under the conditions as shown in Table 6 below. The raw material powder is attached using an organic binder while being heated to a certain temperature, and the uniformly bound and mixed raw material powder is cooled to room temperature.

TABLE 6

| Rotating rate (Arm) | Rotating rate (Screw) | Mixing time |
|---|---|---|
| 40 Hz | 50 Hz | 30 minutes |

The raw material powder having passed through a classifier equipped with a classifying screen having a mesh size of 24 is stored in a hopper body, and a degree of opening of a transfer pipe is adjusted to 75% and 100% when the same is discharged.

The embodiments in which the degree of opening of the transfer pipe are adjusted to 25% and 50%, respectively, were not carried out due to the excess capacity of the hopper body because the discharge amount compared to the inflow into the hopper body is small.

In order to check the component deviation in a 1 ton bag, the content and the segregation amount of the carbon (C) with respect to the raw material powder (comparative example 1) to which a hopper according to the present disclosure is not applied and the raw material powders (examples 1-4) obtained by adjusting the degree of opening of a transfer pipe by applying a hopper according to the present disclosure thereto were tested while the raw material powder contained in the 1 ton bag is discharged in 100 kg units. The results are shown in Table 7 and FIG. 8.

TABLE 7

| Division | Comparative Example 3 (Unapplied) | Example 9 (Degree of opening 25%) | Example 10 (Degree of opening 50%) | Example 11 (Degree of opening 75%) | Example 12 (Degree of opening 100%) |
|---|---|---|---|---|---|
| 100 Kg | 0.68 | Excess capacity | Excess capacity | 0.61 | 0.57 |
| 200 Kg | 0.51 | | | 0.58 | 0.61 |
| 300 Kg | 0.58 | | | 0.59 | 0.59 |
| 400 Kg | 0.64 | | | 0.60 | 0.56 |
| 500 Kg | 0.71 | | | 0.60 | 0.61 |
| 600 Kg | 0.54 | | | 0.60 | 0.55 |
| 700 Kg | 0.66 | | | 0.60 | 0.68 |
| 800 Kg | 0.48 | | | 0.61 | 0.57 |
| 900 Kg | 0.66 | | | 0.64 | 0.62 |
| C Average | 0.61 | | | 0.60 | 0.60 |

Figure 8:
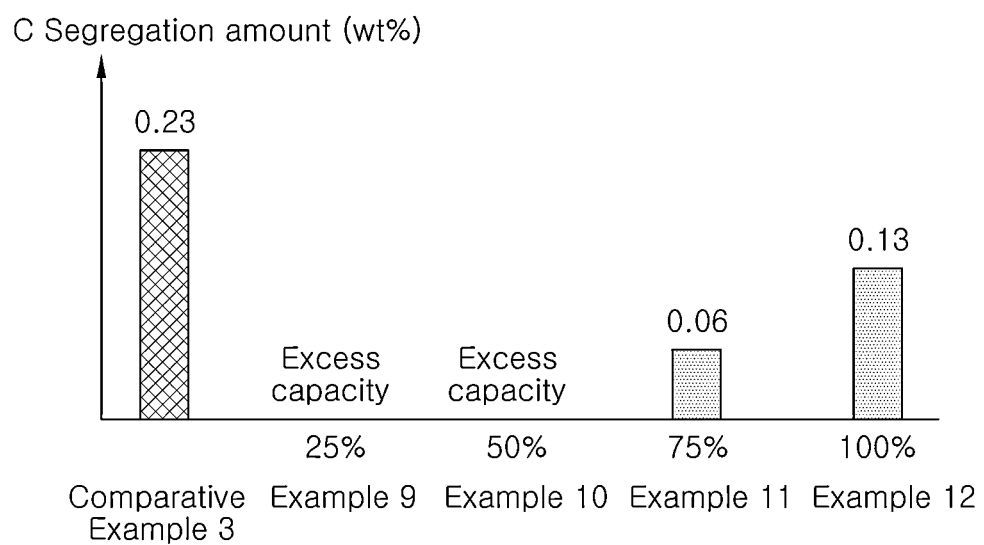

As can be noted from Table 7 and FIG. 8, comparative example 3 showed that the average value of the carbon component in the 1 ton bag is 0.61% and the component deviation is 0.23%. In the meantime, examples 11 and 12 showed that the average values of the carbon component are 0.60% and the component deviations are 0.06-0.13%. Particularly, it was confirmed that the effect of reducing the component deviation is far greater in example 11 in which the degree of opening of the transfer pipe was optimized, compared to comparative example 3.

In the case of the binder mixture, each lot weighs 4 tons, and is quartered to be packaged in a 1 ton bag. In order to check the component deviation between the 1 ton bags for the identical lot, the carbon components for respective 1 ton bags were compared, and the results are shown in Table 8 and FIG. 9.

TABLE 8

| Division | Comparative Example 4 (Unapplied) | Example 13 (Degree of opening 25%) | Example 14 (Degree of opening 50%) | Example 15 (Degree of opening 75%) | Example 16 (Degree of opening 100%) |
|---|---|---|---|---|---|
| 1st bag | 0.61 | Excess capacity | Excess capacity | 0.59 | 0.61 |
| 2nd bag | 0.57 | | | 0.62 | 0.58 |
| 3rd bag | 0.56 | | | 0.61 | 0.62 |

TABLE 8-continued

| Division | Comparative Example 4 (Unapplied) | Example 13 (Degree of opening 25%) | Example 14 (Degree of opening 50%) | Example 15 (Degree of opening 75%) | Example 16 (Degree of opening 100%) |
|---|---|---|---|---|---|
| 4th bag | 0.62 | | | 0.60 | 0.62 |
| C Average | 0.59 | | | 0.61 | 0.61 |

Figure 9:
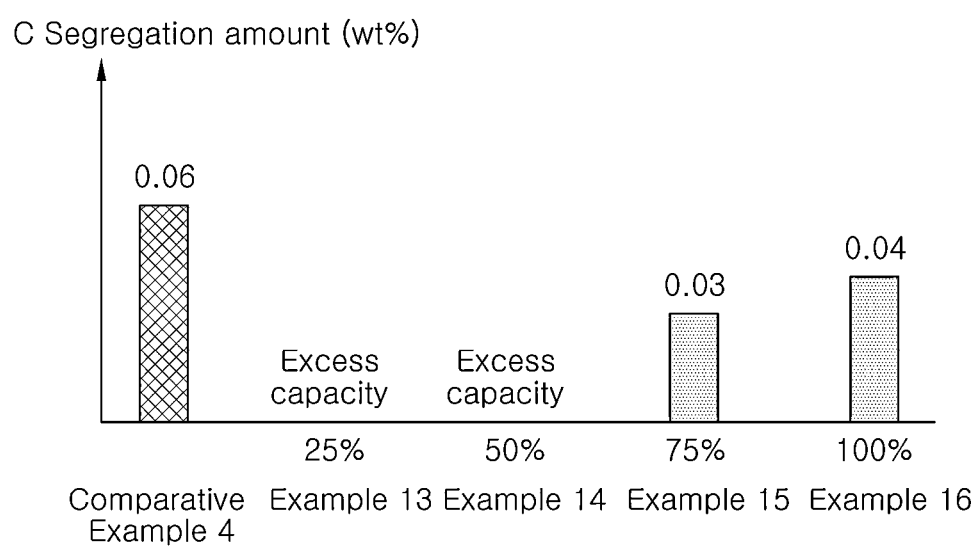

As can be noted from Table 8 and FIG. 9, comparative example 4 showed that the average value of the carbon component in the 1 ton bag is 0.59% and the component deviation is 0.06%. In the meantime, examples 15 and 16 showed that the average values of the carbon component are 0.61% and the component deviations are 0.03-0.04%. Particularly, it was confirmed that the effect of reducing the component deviation is far greater in example 15 in which the degree of opening of the transfer pipe was optimized, compared to comparative example 4.

Although the present disclosure has been described with reference to the accompanying drawings and the above-described embodiments, the present disclosure is not limited thereto, but is defined by the following claims. Accordingly, those of ordinary skill in the art can variously change and modify the present disclosure within the scope without departing from the technical spirit of the claims.

What is claimed is:

1. A hopper for a raw material powder, the hopper comprising:
a hopper body having an inner space in which a raw material powder is stored and including an outlet which is formed through a lower end thereof and through which the raw material powder is discharged;
a transfer pipe to which the raw material powder discharged through the outlet is transferred and which has a region, through which the raw material powder is transferred, divided into a plurality of regions; and
a slide gate unit disposed between the outlet and the transfer pipe to open or close the transfer pipe while adjusting a degree of opening of the transfer pipe,
wherein the transfer pipe is provided with at least one division plate, which is provided therein and provides a plurality of transfer paths by dividing a region through which the raw material powder is transferred, and
wherein the slide gate unit includes a plurality of gates configured to open or close the divided transfer paths of the transfer pipe, respectively, and a plurality of moving shafts configured to operate the gates, respectively.

2. The hopper of claim 1, wherein the transfer pipe has a cross-sectional area of the region, through which the raw material powder is transferred, equally divided by the division plate.

3. The hopper of claim 1, further comprising a control unit configured to control an operation of the slide gate unit according to a storage amount and particle size of the raw material powder stored in the hopper body, to adjust a degree of opening of the transfer pipe.

4. The hopper of claim 3, wherein the control unit individually controls operations of the plurality of moving shafts to adjust a degree of opening of the transfer pipe.

5. The hopper of claim 3, wherein the control unit lowers the degree of opening of the transfer pipe as the particle size of the raw material powder stored in the hopper body decreases.

6. The hopper of claim 3, wherein the hopper body is provided with at least one level sensor configured to sense the raw material powder to be stored therein, and
wherein the control unit detects the storage amount of the raw material powder stored in the hopper body according to a signal sensed by the level sensor.

7. A method for transferring a raw material powder, the method comprising:
a classifying operation of classifying the raw material powder by particle size;
a storing operation of storing the classified raw material powder in a hopper body; and
a transferring operation of discharging and transferring the raw material powder stored in the hopper body through a transfer pipe having a region, through which the raw material powder freely falls to be transferred, divided into a plurality of regions while adjusting a degree of opening of the transfer pipe to discharge the raw material powder.

8. The method of claim 7, wherein a degree of opening of the transfer pipe is adjusted in the transferring operation according to a particle size of the raw material powder classified in the classifying operation.

9. The method of claim 8, wherein a degree of opening of the transfer pipe in the transferring operation is lowered as the particle size of the raw material powder classified in the classifying operation decreases.

10. The method of claim 7, wherein in the transferring operation, a degree of opening of the transfer pipe is controlled by adjusting opening and closing of a region selected from among the plurality of divided regions.

11. The method of claim 10, wherein in the classifying operation,
when the raw material powder to be classified has a particle size allowing passage through a classifying screen of 10 mesh to 25 mesh, the degree of opening of the transfer pipe is adjusted to 100%,
when the raw material powder to be classified has a particle size allowing passage through a classifying screen of greater than 25 mesh and equal to or smaller than 40 mesh, the degree of opening of the transfer pipe is adjusted to 75%,
when the raw material powder to be classified has a particle size allowing passage through a classifying screen of 40 mesh to 55 mesh, the degree of opening of the transfer pipe is adjusted to 50%, and
when the raw material powder to be classified has a particle size allowing passage through a classifying screen of greater than 55 mesh, the degree of opening of the transfer pipe is adjusted to 25%.

12. The method of claim 7, wherein in the storing operation, a storage amount of the raw material powder to be stored in the hopper body is measured in real time,
the degree of opening of the transfer pipe is adjusted to 0% in the transferring operation when a storage rate of the raw material powder stored in the hopper body is 5% or less, and the degree of opening of the transfer pipe is adjusted to 100% in the transferring operation when a storage rate of raw material powder stored in the hopper body is 95% or greater.

* * * * *